United States Patent Office 2,768,155
Patented Oct. 23, 1956

2,768,155

ESTERS OF ACYLOXY-SUBSTITUTED TETRA-HYDROPHTHALIC ACIDS

Harry De V. Finch, Berkeley, and Seaver A. Ballard, Orinda, Calif., assignors to Shell Development Company, Emeryville, Calif., a corporation of Delaware No Drawing. Application February 24, 1953, Serial No. 338,562

10 Claims. (Cl. 260—78.3)

This invention relates to a new class of esters and to their preparation. More particularly, the invention relates to novel esters of acyloxy-substituted tetrahydrophthalic acids, to certain polymers thereof, and to the utilization of the esters and polymers, particularly in the preparation of fungicidal and insecticidal compositions.

Specifically, the invention provides new and particularly useful esters of 3-acyloxy-substituted 1,2,3,6-tetrahydrophthalic acids, and particularly the 3-acyloxy-3-alkyl-substituted 1,2,3,6-tetrahydrophthalic acids. As a special embodiment, the invention provides esters of the 3-acyloxy-substituted 1,2,3,6-tetrahydrophthalic acids and unsaturated alcohols, such as allyl alcohol and methallyl alcohol, and polymers of these esters obtained by polymerizing the ester with themselves or with other ethylenically unsaturated organic compounds. As a further special embodiment, the invention provides fungicidal and insecticidal compositions containing the above-described esters and polymers, and particularly the esters of the 3-acyloxy-3-alkyl-substituted 1,2,3,6 - tetrahydrophthalic acids and their polymers.

This application is a continuation-in-part of our patent application No. 16,148, filed March 20, 1948, now U. S. Patent, No. 2,632,011, which in turn is a continuation-in-part of our patent application No. 554,862, filed September 19, 1944, now abandoned.

It is an object of the invention to provide a new class of esters. It is a further object to provide new and particularly useful esters of 3-acyloxy-substituted 1,2,3,6-tetrahydrophthalic acids, and particularly the 3-acyloxy-3-alkyl-substituted 1,2,3,6-tetrahydrophthalic acids. It is a further object to provide unsaturated esters of 3-acyloxy-substituted 1,2,3,6-tetrahydrophthalic acids which may be used to produce valuable polymeric products. It is a further object to provide esters of 3-acyloxy-substituted 1,2,3,6-tetrahydrophthalic acids and polymers thereof which may be used to prepare insecticidal and fungicidal compositions. It is still a further object to provide esters of 3-acyloxy-substituted 1,2,3,6-tetrahydrophthalic acids which may be used as both a plasticizer and a fungicide or insecticide. It is a further object to provide polymers, and particularly infusible and insoluble polymers, of unsaturated esters of 3-acyloxy-3-alkyl-substituted 1,2,3,6-tetrahydrophthalic acids which have many desirable properties.

It has now been discovered that these objects may be accomplished in part by the novel esters of 3-acyloxy-substituted 1,2,3,6-tetrahydrophthalic acids. The unique structural arrangement of these esters endows the said esters with many unobvious and unexpected properties. These esters, for example, are active against detrimental organisms and may be of value in the preparation of insecticidal and fungicidal compositions. The esters of the 3-acyloxy-3-alkyl-substituted 1,2,3,6 - tetrahydrophthalic acids are particularly valuable as insecticides and fungicides. It has been unexpectedly found that the tertiary ester group on the No. 3 ring carbon atom of these particular esters can be slowly hydrolyzed to liberate a free organic acid. This property enables the esters to maintain their toxic action over a very long period of time. The unsaturated esters of the 3-acyloxy-substituted 1,2,3,6-tetrahydrophthalic acids also possess unexpected toxic action toward various common insects and, in addition, are of value in the preparation of herbicidal compositions.

The esters of the 3-acyloxy-substituted 1,2,3,6-tetrahydrophthalic acids, and particularly the esters of the 3-acyloxy-substituted 1,2,3,6-tetrahydrophthalic acids and the aliphatic alcohols containing at least 4 carbon atoms also may be good plasticizers for synthetic resins. They are compatible with a great many synthetic resins and are able to form therewith compositions having good flexibility and strength. The novel esters may thus act in combination with the synthetic resins both as a plasticizing agent and an insecticide or fungicide.

It has also been found that the unsaturated esters of the 3-acyloxy-substituted 1,2,3,6-tetrahydrophthalic acids are able to be polymerized with themselves or with certain proportions of other ethylenically unsaturated organic compounds to produce resinous product having many unusual and valuable properties. The resins prepared from the 3-acyloxy-3-alkyl-substituted 1,2,3,6 - tetrahydrophthalic acids are of particular interest as they retain a part of the insecticidal and fungicidal properties of the monomeric esters and may be of value in the preparation of coating and impregnating compositions to be used in the treatment of lumber, fabrics, etc.

The acids, novel esters of which are provided by the present invention, comprise the 1,2,3,6-tetrahydrophthalic acids having an acyloxy group, i. e., a

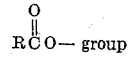

RCO— group wherein R is a radical derived from an organic acid by removing the carboxyl group, attached to the No. 3 ring carbon atom. The acids may be exemplified by 1-butyl-3-acetyloxy-1,2,3,6-tetrahydrophthalic acid, 1,2-diethyl-3-pentanoyloxy-1,2,3,6-tetrahydrophthalic acid, 3-butyl-3-cyclohexanoyloxy-1,2,3,6-tetrahydrophthalic acid, 2-chloro-3-acetoxy-1,2,3,6-tetrahydrophthalic acid, 3-isopropyl-3-acetyloxy-1,2,3,6-tetrahydrophthalic acid, 3-benzoyloxy-4-butyl-1,2,3,6-tetrahydrophthalic acid, 3-toluoyloxy-4-hexyl-1,2,3,6-tetrahydrophthalic acid, 3-chlorotoluoxyloxy-1,2,3,6-tetrahydrophthalic acid, 3-acetyloxy-5-decyl-1,2,3,6-tetrahydrophthalic acid, 3-(2'-chloro-3'-cyclohexenoyloxy)-1,2,3,6-tetrahydrophthalic acid, 3-pentanoyloxy-5-octyl-1,2,3,6-tetrahydrophthalic acid and 3-dodecyl-3-acetyloxy-1,2,3,6-tetrahydrophthalic acid.

Preferred acids are those wherein the acyloxy group on the No. 3 ring carbon atom is derived from a monocarboxylic acid, and particularly an unsubstituted aliphatic monocarboxylic acid containing from 2 to 10 carbon atoms, the No. 1 and 2 ring carbon atoms are joined to the two carboxyl groups and to hydrogen atoms, and the other ring carbon atoms are joined to a member of the group consisting of hydrogen and alkyl radicals containing no more than 6 carbon atoms. Examples of such acids include 3 - acetyloxy - 3,5 - dimethyl-1,2,3,6-tetrahydrophthalic acid, 3-butyl-3-butanoyloxy-1,2,3,6-tetrahydrophthalic acid, 3-isohexyl-3-pentanoyloxy-1,2,3,6-tetrahydrophthalic acid and 3-cyclohexanoyloxy-5-butyl-1,2,3,6-tetrahydrophthalic acid.

Coming under special consideration, particularly because of the fine toxic action of the resulting esters, are the 1,2,3,6-tetrahydrophthalic acids having the No. 3 ring carbon atom attached to an alkyl radical, preferably containing from 1 to 8 carbon atoms, and an acyloxy group derived from an alkanoic, alkenoic, cycloalkanoic or cycloalkenoic acid containing no more than 8 carbon atoms, the No. 1 and 2 ring carbon atoms are joined to the two carboxyl groups and hydrogen atoms and the rest of the ring carbon atoms are attached to a member of the group consisting of hydrogen and alkyl groups containing no more than 6 carbon atoms, such as 3-acetyloxy-3,5-dimethyl-1,2,3,6-tetrahydrophthalic acid, 3 - isopropyl-3-butanoyloxy-1,2,3,6-tetrahydrophthalic acid, 3-cyclohexanoyloxy - 3,5 - diisohexyl - 1,2,3,6 - tetrahydrophthalic acid, 3-butenoyloxy-3,5-dibutyl-1,2,3,6-tetrahydrophthalic acid, 3 - cyclohexenoyloxy - 3 - amyl-1,2,3,6-tetrahydrophthalic acid and 3-cyclopentenoyloxy-3-octyl-1,2,3,6-tetrahydrophthalic acid.

The novel esters of the invention may be derived by esterifying any one of the above-described acids with a compound containing an esterifiable hydroxyl group. Such hydroxyl-containing compounds may be aliphatic, aromatic or heterocyclic and may be saturated or unsaturated. Examples of such compounds include methyl alcohol, ethyl alcohol, butyl alcohol, isobutyl alcohol, amyl alcohol, decyl alcohol, cyclohexanol, cyclopentanol, allyl alcohol, methallyl alcohol, 2-butanol, cyclopentenol, cyclohexenol, phenol, naphthol, benzyl alcohol, glycol monoacetate, ethylene glycol, glycerol, 2,4-butanediol, 2,4,6-heptanetriol, polyvinyl alcohol, polyallyl alcohol, resorcinol, pyrocatechol, 1,5-cyclopentanediol and polyols obtained by reacting epichlorohydrin with polyhydric phenols or aliphatic polyhydric alcohols.

Preferred hydroxy-containing compounds include the aliphatic monohydric alcohols containing from 1 to 14 carbon atoms and the aliphatic polyhydric alcohols containing from 2 to 4 hydroxyl groups and from 2 to 14 carbon atoms, such as methyl alcohol, allyl alcohol, butyl alcohol, decyl alcohol, dodecyl alcohol, 3-butenol, 4-octenol, 2,4,6-heptanetriol, cyclohexanol, 1,4-cyclohexanediol, ethylene glycol, diethylene glycol, glycerol, pentaerythritol and glycerol monoacetate.

Particularly preferred, because of the fine plasticizing properties of the resulting esters, are the monohydric aliphatic alcohols containing from 4 to 14 carbon atoms, such as amyl alcohol, hexyl alcohol, nonyl alcohol, 2-ethylhexanol, 3,3,5-dimethylhexanol, dodecyl alcohol, allyl alcohol, isoamyl alcohol and tetradecyl alcohol. The alkanols containing from 4 to 10 carbon atoms are still more preferred members of this group.

Coming under special consideration, particularly because of the ability of the resulting esters to undergo polymerization to form resinous products having valuable properties, are the ethylenically unsaturated monohydric alcohols, such as allyl alcohol, methallyl alcohol, 2 - hexanol, 2 - chloro-2-hexenol, 1-pentenol, 3-chloro-2-octenol, and 2-butyl-2-hexenol. Of special value in the preparation of this type of ester are the beta, gamma-ethylenically unsaturated aliphatic monohydric alcohols containing from 3 to 12 carbon atoms and still more particularly the 2-alkenols containing no more than 8 carbon atoms.

The novel esters of the invention comprise the esters of at least one of the above-described acids and one or more of the above-described hydroxy-containing compounds. Examples of esters include diallyl 3-acetyloxy-3,5 - dimethyl-1,2,3,6-tetrahydrophthalate, dimethallyl 3-acetyloxy - 3-butyl-1,2,3,6-tetrahydrophthalate, dichloroallyl 3-acetyloxy-3,5-dimethyl-1,2,3,6-tetrahydrophthalate, dioctyl 3 - acetyloxy-3-butyl-1,2,3,6-tetrahydrophthalate, diallyl 3-pentanoyloxy-1,2,3,6-tetrahydropthalate, dihexyl 3 - benzoyloxy - 3,4 - diheptyl-1,2,3,6-tetrahydrophthalate, didecyl 3-heptanoyloxy-1,2,3,6-tetrahydrophthalate, diallyl 3-toluoyloxy-1,2,3,6-tetrahydrophthalate, dicyclopentyl 3-propionoyloxy-1,2,3,6-tetrahydrophthalate, and didodecyl 3-acetyloxy-3,5-diethyl-1,2,3,6-tetrahydrophthalate.

The preferred esters which are derived from the 3-acyloxy - 3 - alkyl-substituted 1,2,3,6-tetrahydrophthalic acids may be exemplified by diallyl 3-acetyloxy-3,5-dioctyl-1,2,3,6-tetrahydrophthalate, dioctyl 3-propionoxy-3-butyl-1,2,3,6-tetrahydrophthalate, dicyclohexyl 3-toluoyloxy-3-decyl-1,2,3,6-tetrahydrophthalate, didodecyl 3-butanoyloxy - 3,5-diethyl-1,2,3,6-tetrahydrophthalate, dibenzyl 3-acetyloxy-3,5-dioctyl-1,2,3,6-tetrahydrophthalate and diallyl 3 - octyl-3-(2'-chlorobutanoyloxy)-1,2,3,6-tetrahydrophthalate.

The esters which may have outstanding properties as plasticizers, i. e. those derived from the alcohols containing from 4 to 14 carbon atoms, are exemplified by dioctyl 3 - acetyloxy - 3,5 - dimethyl-1,2,3,6-tetrahydrophthalate, dibutyl 3-propionoyloxy-3-butyl-1,2,3,6-tetrahydrophthalate, cyclohexyl butyl 3-acetyloxy-3-butyl-1,2,3,6-tetrahydrophthalate, dodecyl tetradecyl 3 - acetyloxy - 3-cyclohexyl-1,2,3,6-tetrahydrophthalate and dinonyl 3-butanoyloxy-1,2,3,6-tetrahydrophthalate.

The esters having the ability to be polymerized to produce the useful resinous products as described above may be exemplified by diallyl 3-acetyloxy-3,5-dimethyl-1,2,3,6-tetrahydrophthalate, dimethallyl 3-propionoyloxy-3-octyl-1,2,3,6-tetrahydrophthalate, divinyl 3-toluoyloxy-1,2,3,6-tetrahydrophthalate, dichloroallyl 3-acetyloxy-3-butyl-5-chloro-1,2,3,6-tetrahydrophthalate.

The esters of the invention may be prepared by a variety of different methods. They may be prepared, for example, by reacting the acid or acid anhydride with the alcohol, by reacting an acid chloride with the alcohol or by reacting a sodium salt of the acid with a halide corresponding to the desired alcohol. These esters may also be prepared by condensing an acyloxy-substituted compound containing a conjugated system of double bonds with the desired ester of a maleic acid.

The novel esters are preferably prepared by a direct esterification process wherein the above-described acids or their anhydrides are reacted with the desired alcohol in the presence of an esterification catalyst, and in some cases in the presence of an azeotrope agent which assists in removing the water formed in the reaction. Catalysts that may be utilized in this process may be exemplified by p-toluenesulfonic acid, benzenesulfonic acid, hydrobromic acid, chloroacetic acid, sulfuric acid, formic acid, boron and silicon fluorides, acid salts, such as monosodium sulfate and salts of strong acids and weak bases, such as zinc chloride and zinc sulfate. The amount of the catalyst employed will vary over a wide range depending on the particular type of reactants, type of catalyst selected and reaction conditions employed. In most cases, the amount of catalyst will vary from 0.1% to 5% by weight of the reactants and more preferably from 0.5% to 3% by weight of the reactants.

The amount of the acid or anhydride and the alcohol employed in the esterification reaction may vary over a wide range depending upon the reactants and types of products desired. In general, at least one mole, and preferably from 1.1 to 2 moles, of alcohol should be employed for every carboxyl group to be esterified. It may be desirable, however, in some cases to employ larger amounts of the alcohol so that it might be removed during the reaction in admixture with the water and azeotrope former.

In the case of the unsaturated alcohols it may be desirable to accomplish the esterification in the presence of a polymerization inhibitor, such as copper bronze powder, sulfur, p-phenylenediamine, hydroquinone, tannic acid and various amino and sulfur compounds. These inhibitors may be subsequently removed by washing, distillation, extraction and the like.

The temperature employed during the esterification process may also vary over a considerable range. As a general proposition, temperatures ranging from 50° C. to 200° C. may be used in the process, with temperatures ranging from 90° C. to 150° C. being more preferred. Atmospheric, subatmospheric or superatmospheric pressures may be employed as desired. In those cases where it is desirable to prevent the subsequent polymerization of the esters, it is usually advisable to avoid the use of pressures which might accelerate the polymerization.

The water formed during the esterification may be removed during or at the completion of the process. The removal of the water may be accomplished by methods well known in the art. It is usually preferred to utilize an azeotrope former and remove the water of esterification during the process by azeotropic distillation.

The esters may be recovered and purified by any suitable method, such as distillation, extraction, crystallization and the like.

The esters of the invention are also preferably prepared in some instances by first esterifying maleic acid, maleic anhydride or a substituted maleic acid or its anhydride with the desired alcohol according to conventional methods and then condensing this diester of the maleic acid with an acyloxy-substituted compound possessing a conjugated system of double bonds. This method of preparation may be illustrated by the following equation showing the preparation of diallyl 3-acetyloxy-3,5-dimethyl-1,2,3,6-tetrahydrophthalate by condensing diallyl maleate with mesityl acetate:

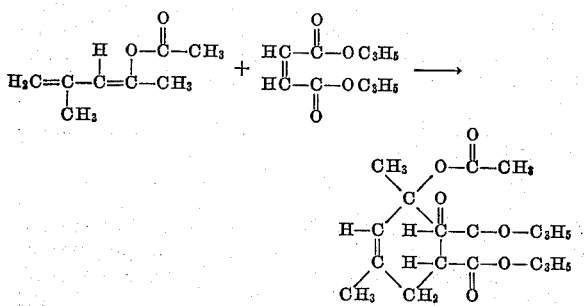

This type of condensation reaction may be carried out by contacting approximately equimolecular amounts of the ester of the maleic acid and the acyloxy-substituted compound at a temperature sufficiently high to effect the condensation within a reasonable time. In most instances, reaction temperatures of from about 30° C. to about 100° C. are suitable. Preferred temperatures range from about 30° C. to 50° C. The condensation may be carried out, if desired, in the presence of suitable solvents, such as aromatic hydrocarbon solvents, e. g., benzene and toluene. When the reaction is complete, the solvent, if any is present, may be removed and the adduct separated by crystallization or by fractional distillation, preferably under diminished pressure.

The acyloxy-substituted compound containing the conjugated system of double bonds which may be utilized in the above-described method of preparing the esters of the invention may be represented by the general formula

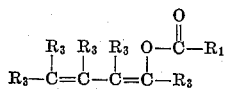

wherein $R_1$ is an organic radical derived from a carboxylic acid and each $R_3$ is a non-interfering substituent. The $R_1$ in the above formula will determine the radical to be attached to the ester group on the No. 3 ring carbon atom of the novel esters of the invention and will, therefore, represent the same substituents as described above for the R of the acyloxy group of the claimed esters. The $R_3$'s in the above formula will determine the radicals attached to the No. 3 to No. 6 ring carbon atoms of the novel esters of the invention so they will represent the same ring substituents as described above for the novel esters. Examples of such compounds include 1-propionoyloxy-1,3-butadiene, 1-benzoyloxy-2,3-dibutyl-1,3-butadiene, 2-hexenoyloxy-5-butyl-2,4-heptadiene and 3-cyclohexenoyloxy-4,5-dichloro-3,5-octadiene.

If substituents other than hydrogen are desired on the No. 1 and 2 ring carbon atoms of the novel esters of the invention, the esters used in the above-described condensation reaction will be an ester of a substituted maleic acid, such as an ester of methylmaleic acid, dibutylmaleic acid, dichloromaleic acid, dioctylmaleic acid and the like.

The novel esters of the invention will be relatively colorless crystalline or granular solids to viscous liquids. As indicated above, the esters may be used in insecticidal and fungicidal compositions and as plasticizers or additives for lubricating compositions.

The esters are particularly valuable as additives for insecticidal and fungicidal spray or dust compositions. In such compositions the esters may be dissolved in suitable non-corrosive organic solvents, emulsified with water and wetting and dispersing agents or dispersed in and on finely divided solid carriers, such as diatomaceous earth, bentonite, talc, wood flour, etc. If desired, the esters may be employed in combination with pyrethrin- or rotenone-containing extracts or with other organic and inorganic insecticidal toxicants.

The esters of the unsaturated alcohols, such as allyl alcohol, may also be polymerized with themselves or with other ethylenically unsaturated compounds to produce valuable polymeric products. The novel unsaturated esters may, for example, be polymerized with monomers containing a single $CH_2=C=$ group, such as acrylonitrile, vinyl chloride, methyl methacrylate, vinylidene chloride, butyl methacrylate, vinyl chloroacetate, vinyl benzoate, allyl propionate, allyl chloride and vinyl caproate, or with monomers containing a plurality of $CH_2=C=$ groups, such as diallyl phthalate, butadiene, divinyl succinate, diallyl ether, allyl acrylate, vinyl allyl ether and methallyl vinyl ether. The proportions used in preparing these copolymers may vary over a wide range depending upon the monomers selected and the properties desired for the finished product. In general, copolymers having the desired insecticidal properties may be obtained by employing the novel unsaturated esters in amounts varying from 20% to 99% by weight of the reactants.

The polymerization may be accomplished by merely heating the monomer or monomers in the presence of a polymerization catalyst. The polymerization may be effected in bulk, in the presence of solvents or in an aqueous emulsion or suspension. If solvents are employed, they may be solvents for the monomers and polymers or solvents for the monomer and non-solvents for the polymer. Example of solvents that may be used include benzene, toluene, cumene, dioxane and the like.

Oxygen-containing polymerization catalysts are effective in accelerating the polymerization of the compounds of the invention. Illustrative examples of such catalysts are benzoyl peroxide, acetyl peroxide, acetyl benzoyl peroxide, lauryl peroxide, dibutyl peroxide, succinyl peroxide, sodium peroxide, tertiary alkyl hydroperoxides, such as tertiary butyl hydroperoxide, peracetic acid, perphthalic acid, perborates and the like. Another class of polymerization catalysts which are effective is the di(tertiary alkyl) peroxides such as di(tertiary butyl) peroxide. The polymerization may be accomplished in the presence of mixtures of polymerization catalysts as benzoyl peroxide and hydrogen peroxide, for example, or it may be accomplished in the presence of both a catalyst and a polymerization inhibitor.

The temperatures employed in the catalyst will generally depend on the type of catalyst selected and the desired rate of polymerization. In general, the temperature employed will vary from about 50° C. to 150° C. and more preferably from 65° C. to 125° C.

If the novel esters used to prepare the polymers possess at least two ethylenic linkages, the polymerization may be interrupted when the soluble, fusible polymer has been formed and the mixture containing this polymer may then be transferred to a mold or used to impregnate porous materials, etc., and the polymer then cured by use of heat and pressure to form the infusible, soluble polymer.

The novel esters, and particularly those prepared from the higher aliphatic alcohols, may be useful as plasticizers for various organic thermoplastic materials, such as the cellulose derivatives and vinyl polymers, such as vinyl chloride polymers, vinylidene chloride polymers, acrylonitrile polymers, styrene polymers and the like.

The esters may be used as the plasticizer alone or they may be used in combination with other plasticizers, such as dioctyl phthalate, dibutyl phthalate, tricresyl phosphate and the like. The esters are generally employed in amounts varying from 30 parts to 100 parts by weight of the resin or polymer and more preferably from 40 parts to 75 parts by weight of the resin or polymer. The plasticizer and resin or polymer may be compounded together by means of conventional equipment such as mills of the heated roll type or internal mixers. The plasticizer and other compound ingredients are worked into the resin so that they are thoroughly dispersed therein by means of such equipment and the resulting composition then molded, calendered, extruded or otherwise formed into articles of the desired shape by conventional procedure.

To illustrate the manner in which the invention may be carried out, the following examples are given. It is to be understood, however, that the examples are for the purpose of illustration and the invention is not to be regarded as limited to any of the specific conditions cited therein. Unless otherwise specified, parts disclosed in the examples are parts by weight.

*Example I*

About 238 parts of 3,5-dimethyl-3-acetyloxy-1,2,3,6-tetrahydrophthalic anhydride was mixed with 232 parts of allyl alcohol, 500 parts of benzene and 5 parts of p-toluenesulfonic acid and the resulting mixture heated under reflux. The water formed during the reaction was removed by azeotropic distillation with the benzene. The excess allyl alcohol was removed leaving a granular material which was the desired ester diallyl 3,5-dimethyl-3-acetyloxy-1,2,3,6-tetrahydrophthalate.

This ester may be used as an additive for fungicidal compositions, which are particularly effective against *Monolinia fructicola* and *Alternaria oleracea*.

The ester may also be polymerized in the presence of 2% by weight of benzoyl peroxide to form a hard polymer which may be used in preparing fungicidal compositions.

*Example II*

About 224 parts of 3-methyl-3-acetyloxy-1,2,3,6-tetrahydrophthalic anhydride is mixed with 278 parts of methallyl alcohol, 500 parts of toluene and 5 parts of p-toluenesulfonic acid and the mixture heated under reflux. The water formed during the reaction is removed by azeotropic distillation with the benzene. The excess methallyl alcohol is removed leaving a crystalline material which is identified as dimethallyl 3-methyl-3-acetyloxy-1,2,3,6-tetrahydrophthalate.

The ester produced above is polymerized in the presence of benzene and 2% 2,2-bis(tertiary butyl peroxy)butane to form a hard polymer which may be used in preparing fungicidal compositions.

*Example III*

About 252 parts of 3,5-dimethyl-3-propionoyloxy-1,2,3,6-tetrahydrophthalic anhydride is mixed with 232 parts of allyl alcohol, 500 parts of benzene and 5 parts of p-toluenesulfonic acid and the resulting mixture heated under reflux. The water formed during the reaction is removed by azeotropic distillation with the benzene. The excess allyl alcohol is removed leaving a granular material identified as diallyl 3,5-dimethyl-3-propionoyloxy-1,2,3,6-tetrahydrophthalate.

50 parts of this ester are polymerized with 50 parts of diallyl phthalate in the presence of 2% 2,2-bis(tertiary butyl peroxy)butane to produce a hard casting.

Products having related properties are obtained by replacing the allyl alcohol in the above-described process with equivalent amounts of each of the following alcohols: methallyl alcohol, chloroallyl alcohol and 2-ethyl-2-butenol.

*Example IV*

About 308 parts of 3,5-dimethyl-3-cyclohexanoyloxy-1,2,3,6-tetrahydrophthalic anhydride are combined with 232 parts of allyl alcohol, 500 parts of benzene and 3 parts of sulfuric acid, 2 parts of tannic acid and the resulting mixture heated under reflux. The water formed during the reaction is removed by azeotropic distillation with the benzene. The excess alcohol is removed leaving a granular material identified as diallyl 3,5-dimethyl-3-cyclohexanoyloxy-1,2,3,6-tetrahydrophthalate.

70 parts of this ester are polymerized with 30 parts of methyl methacrylate to produce a hard polymer which may be used in preparing insecticidal compositions.

*Example V*

About 300 parts of 3-methyl-3-octanoyloxy-1,2,3,6-tetrahydrophthalic anhydride are combined with 296 parts of isobutanol, 500 parts of benzene and 3 parts of p-toluenesulfonic acid and the mixture heated under reflux. The water formed is removed azeotropically with the benzene. The ester recovered from the reaction mixture is identified as diisobutyl 3-methyl-3-octanoyloxy-1,2,3,6-tetrahydrophthalate.

About 100 parts of poly(vinyl chloride) are compounded with 40 parts of the above-described ester and 30 parts of dioctyl phthalate by mixing the two ingredients together with 2 parts, per 100 parts of polymer, of a trade stabilizer, milling the mixture together on a roll mill at a temperature between 130° C. and 150° C. and then molding the resulting sheet at 160° C. for two minutes. The resulting sheet possesses good strength and flexibility.

Esters having properties related to those of diisobutyl 3-methyl-3-octanoyloxy-1,2,3,6-tetrahydrophthalate may be obtained by replacing the isobutanol in the above-described process by equivalent amounts of each of the following alcohols: amyl alcohol, octyl alcohol, 2-ethylhexanol, 2,3,5-trimethylhexanol and decanol.

*Example VI*

About 300 parts of 3-butyl-3-benzoyloxyl-1,2,3,6-tetrahydrophthalic anhydride are combined with amyl alcohol, 500 parts of benzene and 4 parts of p-toluenesulfonic acid and the mixture heated under reflux. The water formed is removed azeotropically with the benzene. The ester recovered from the reaction mixture is identified as diamyl 3 - butyl - 3 - benzoyloxy-1,2,3,6-tetrahydrophthalate.

About 100 parts of poly(vinyl chloride) are compounded with 40 parts of the above-described ester and 30 parts of dioctyl phthalate by mixing the two ingredients together with 2 parts of a trade stabilizer, milling the mixture together on a roll mill at 130° C. to 150° C. and then molding the sheets at 160° C. for two minutes. The resulting sheet possesses good strength and flexibility.

We claim as our invention:

1. A diester of a 3-acyloxy-3-alkyl-1,2,3,6-tetrahydrophthalic acid having 1 to 8 carbon atoms in said alkyl group, wherein the acyloxy radical is derived from a monocarboxylic hydrocarbon acid having 2 to 10 carbon atoms by removing the hydrogen atom of the carboxyl group, and a beta-gamma-monoethylenic aliphatic monohydric alcohol of 3 to 12 carbon atoms per molecule.

2. A polymer of the ester defined in claim 1 having fungicidal and insecticidal properties.

3. A diester of a 3-alkanoyloxy-3-alkyl-1,2,3,6-tetrahydrophthalic acid having 3 to 10 carbon atoms in the alkanoyl group and 1 to 8 carbon atoms in said alkyl group and a beta,gamma-monoethylenic alkenol having 3 to 12 carbon atoms per molecule.

4. A hard, solid polymer of an ester of claim 3 having fungicidal and insecticidal properties.

5. A dialkenyl 3,5-dialkyl-3-alkanoyloxy-1,2,3,6-tetrahydrophthalate wherein the alkenyl groups are beta-gamma-ethylenic groups of 3 to 8 carbon atoms, the alkyl groups contain 1 to 6 carbon atoms and the alkanoyloxy group contains 2 to 10 carbon atoms.

6. An ester of the group consisting of the diallyl and dimethallyl esters of the 3-alkanoyloxy-3-alkyl-1,2,3,6-tetrahydrophthalic acids having 1 to 8 carbon atoms in said alkanoyl group and 1 to 6 carbon atoms in said alkyl group.

7. Diallyl 3,5 - dimethyl - 3 - acetyloxy-1,2,3,6-tetrahydrophthalate.

8. Diallyl 3,5 - dimethyl - 3 - propionoyloxy - 1,2,3,6-tetrahydrophthalate.

9. Dimethallyl 3 - methyl - 3 - acetyloxy - 1,2,3,6-tetrahydrophthalate.

10. A copolymer of diallyl 3,5-dimethyl-3-propionoyloxy - 1,2,3,6 - tetrahydrophthalate and diallyl phthalate.

References Cited in the file of this patent
UNITED STATES PATENTS

| 2,632,011 | Finch et al. | Mar. 17, 1953 |

FOREIGN PATENTS

| 695,865 | Germany | Sept. 4, 1940 |
| 739,438 | Germany | Sept. 28, 1943 |

OTHER REFERENCES

Liebig's Annalen der Chemie, 551 (1942), pages 21, 22, 23, 59 and 60.